Aug. 9, 1938.  G. W. LAPP ET AL  2,126,481
DUST SEPARATOR
Original Filed July 29, 1933    4 Sheets-Sheet 1

FIG. I.

Grover W. Lapp,
Hugo Van Rosen,
Inventors,
Delos G. Haynes,
Attorney.

Aug. 9, 1938.   G. W. LAPP ET AL   2,126,481
DUST SEPARATOR
Original Filed July 29, 1933   4 Sheets-Sheet 4

Grover W. Lapp,
Hugo Van Rosen,
Inventors,
Delos F. Haynes,
Attorney.

Patented Aug. 9, 1938

2,126,481

UNITED STATES PATENT OFFICE 2,126,481

DUST SEPARATOR

Grover W. Lapp, Le Roy, N. Y., and Hugo Van Rosen, Newton Center, Mass.; said Lapp assignor to said Van Rosen, now by judicial change of name Hugo Van Roosen Application July 29, 1933, Serial No. 682,788
Renewed August 10, 1936

17 Claims. (Cl. 183—77)

This invention relates to dust separators, and with regard to certain more specific features, to dust separators operating upon the principle of centrifugal-dynamic separation.

Among the several objects of the invention may be noted the provision of dust separators of the class described which operate, with minimum power consumption, to remove dust or solid particles from the gas medium in which they are suspended, the removal being accomplished effectively for all particle sizes that it is desired to remove, and the discharge of the particles from the separator being continuous, whereby the separator is continuous in operation, as contrasted with a separator limited to batch operations; a dust separator of the class described which effects complete precipitation from relatively large quantities of dust-laden gas in a minimum of time and space, the entire separator, in ordinary circumstances, occupying only a space of the nature of that required for a centrifugal blower or the like; a separator in which the dust precipitation is efficient and complete and the dust segregation, after precipitation, is equally efficient and complete, so that the discharged gas is in fact dust-free to the required extent; and a separator of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Similar reference characters indicate corresponding parts throughout the several views of the drawings.

The present invention is concerned particularly with that class of dust precipitation apparatus which operates on inertial principles, that is, upon the basis of the fact that the suspended matter to be precipitated has a density largely in excess of that of the suspending medium. The suspended matter is generally solid, comprising a large number of minute particles, while the suspending medium is usually air. However, the present invention operates also when the suspended matter is liquid, in the form of minute droplets, or when the suspending medium is any other gas.

It has been determined that, in the majority of suspensions of the type herein concerned, the particle size ranges from below one micron in diameter to 100 or more microns in diameter. From the health standpoint, particles larger than 100 microns in diameter are generally considered non-injurious. It so happens that the majority of industrial suspensions which it is desirable or necessary to separate, comprise particles within the range of 0.5 to 100 microns in diameter. For example, reliable determinations have established the following table:

| Kind of suspension | Particle diameter |
|---|---|
| Talc dust | 9 to 10 microns. |
| Silica dust | 3 to 5 microns. |
| Ammonium chloride fumes | About 1 micron. |
| Paint pigment dust | 2 to 5 microns. |
| Cement dust | 40 microns and less. |
| Alkali fumes | 1 to 5 microns. |
| Coal-ash spheres | 5 to 10 microns. |

The present invention is designed to precipitate, accordingly, particles varying in diameter from about 0.5 up to 100 microns, although it will be understood that the design factors may be altered to make the device more suitable for finer, or coarser particles.

The basic rules affecting the separation of particles of these sizes from their gas suspending media are, first, Stokes' law, and, second, the laws of centrifugal force. Stokes' law gives the final, stable velocity of fall of a particle in a still gas according to the formula:

$$(1) \quad v_s = \frac{gd^2p}{km}$$

where $v_s$ is the velocity of the particle with respect to the gas,
   $d$ is the diameter of the particle,
   $p$ is the density of the particle,
   $g$ is the acceleration due to gravity,
   $m$ is the viscosity of the gas,
and   $k$ is a constant.

If the values be calculated for spherical particles of density about 3.0, and in air (viscosity= $1.8 \times 10^{-4}$ c. g. s. units), the following table is secured:

| Diameter of particles, microns | Rate of fall, feet per second |
|---|---|
| 100 | 3 |
| 74 | 1.6 |
| 10 | .03 |
| 1 | .0003 | from which it is evident that in still air no appreciable settling at all would occur within reasonable time with particles of a diameter of 10 microns or less.

With inertial methods of separation, the acceleration of gravity in the above formula is replaced by an acceleration due to centrifugal force. The centrifugal force is achieved, in devices heretofore used, by conducting a stream of the suspension around a circle or fraction of a circle, in a "cyclonic" manner. The basic formula for such inertial or centrifugal separation is as follows:

$$(2) \quad V_s = \frac{d^2 p a w^2}{km}$$

where $a$ is the radius of curvature of the path described by the gas, $w$ is the angular velocity of the gas and suspended matter, $k$ is a constant, and the other symbols indicate the same properties as those set forth in connection with equation (1) above. This formula is derived by substituting the centrifugal force for the gravitational in the Stokes' law Equation (1) above.

From the practical standpoint, however, it is not only the settling velocity of the particle which is important, but also the radial distance D the particle will move out of the gas stream while in the separator. If it be assumed that the gas moves in a circular path with a uniform velocity V, and that while in the apparatus it will move through the angular distance S, then the following equation will express the relation between V, D, and S:

$$(3) \quad V = \frac{kDm}{Spd^2}$$

Following this equation, if it be assumed that an apparatus similar to a cyclone is used, in which the entire path of the gas is circular and in a horizontal plane, and that the angular distance is about 4 radians, and that the particle must move a distance of 3 feet in order to be precipitated, the following relation between the values for V and $d$ are obtained:

| Diameter of particle, microns | Gas velocity, feet per second |
|---|---|
| 100 | 8 |
| 74 | 15 |
| 10 | 800 |
| 1 | 80,000 |

From these figures it is evident that the ordinary cyclone type precipitator is impractical for particles smaller than, say, 50 microns in diameter, on account of the high gas velocity required. In such an ordinary cyclone collector the rate of settling of the particle must be equal to or greater than the radial velocity of the gas as it advances or the particle will be carried through with the gas. This fact limits the particle size that can be separated with such a "cyclone" collector.

In the present invention, which operates upon inertia principles and according to the Equation (3) above, separation and precipitation of particles of small diameter is achieved, first, by increasing the centrifugal force value greatly by increasing the angular velocity of the gas, and second, by reducing to a relatively small linear distance the path through which the particle must move in order to be precipitated.

While it has not heretofore been mentioned, it will be apparent that capacity is another of the principal factors affecting the practical utility of separators of the type herein concerned. Broadly, the capacity of the separator is the volume of gas and suspended matter that the separator will operate upon in a unit of time. This involves consideration of the concentration of particles in the suspension, for the separator must be able to take care of all of the particles precipitated in the unit volume; otherwise there will be a flooding and the device will not separate efficiently. The separator of the present invention is designed to have a large capacity in terms of volume throughout, and is further designed to take care of all particles precipitated, as it is continuous in its particle discharge as well as in its cleaned gas discharge.

Still a further factor affecting the practical availability of separators of the class herein concerned is their capacity in terms of the amount of separated dust, or solid matter, that can be collected before it is necessary to shut down the separator to clean it out. The present invention completely avoids all such shut-downs, as it provides for continuously discharging the separated dust from the separator. Thus, in the present invention, a stream of dust-laden gas is introduced, and from the device issue two streams, one of cleaned gas, and the other of the separated dust.

Basically, the present invention comprises a series of surfaces arranged so as to be at an angle to a radius drawn from an axis of rotation, and means or creating a swirl or vortex of the suspension from the outer periphery of the series of surfaces inwardly, precipitation then taking place on the surfaces due to the centrifugal force exerted on the particles by the swirl or vortex action. In the preferred embodiment, the surfaces comprise a series of nested cones which are spaced apart a relatively short distance, such as from one-eighth to one-tenth of an inch, more or less. The dust-laden air is admitted to the cones at their outer periphery, preferably at a high tangential speed, and it swirls inwardly through the cones to be discharged at the center of the nest, the swirl providing the centrifugal force to precipitate the dust particles on the cone walls. Then, in order to discharge the dust, the cones are themselves rotated at a high angular speed, whereby the precipitated dust particles are thrown outwardly to the outer periphery of the cones by centrifugal action directly thereon. As the precipitated particles roll or slide outwardly, under the tremendous centrifugal forces, they agglomerate into large aggregates (in the manner that a snow-ball agglomerates in rolling down a hillside) so that when the periphery is reached, the aggregates are of sufficient size that they are literally thrown across the incoming stream of air, possibly without disintegrating, to means which continuously collect the aggregates and discharge them from the separator in a constantly flowing stream. The counterflow of the incoming dirt-laden air and the discharging precipitated dirt is one of the basic features of the present invention.

Figure 1:
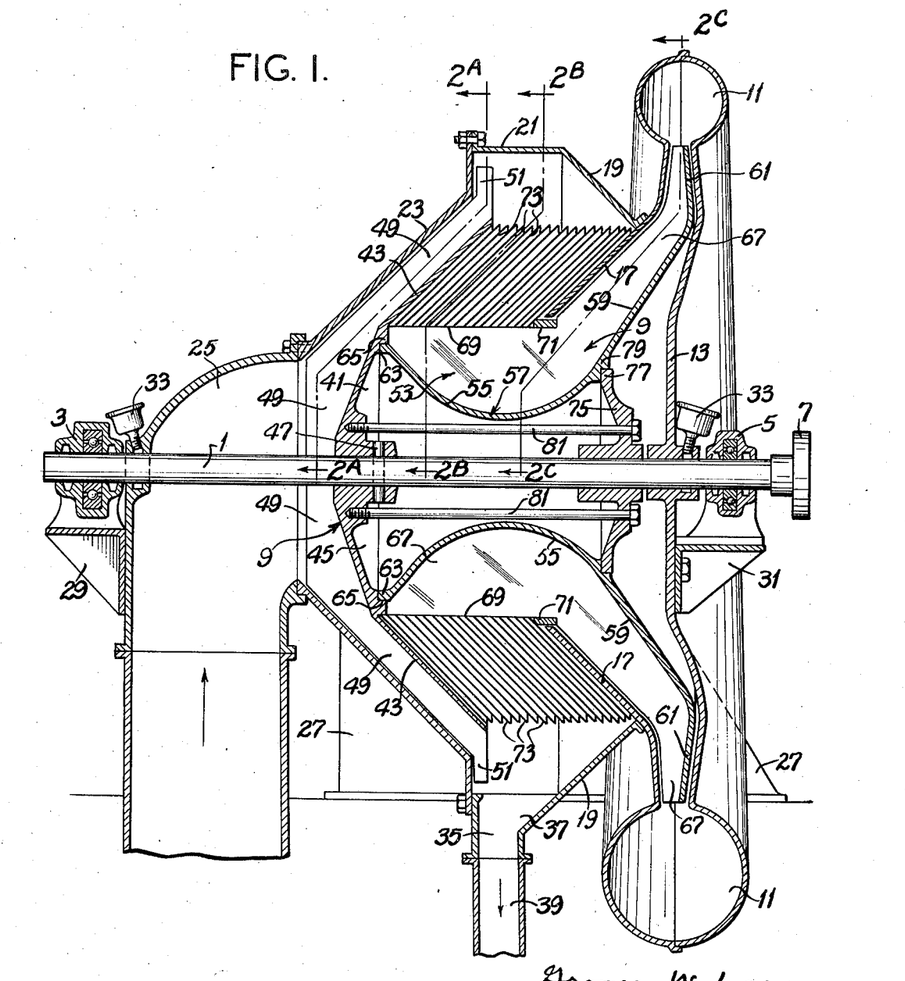
Fig. 1 is an axial section of a separator embodying the present invention.

Proceeding to a more detailed description of one embodiment of the invention, reference is directed to Fig. 1 of the drawings, wherein numeral 1 indicates a shaft suitably carried in bearings 3 and 5. At the right-hand end of the shaft, a coupling means 7 is provided for attaching the shaft to a suitable prime mover, such as an electric motor. The shaft 1 traverses the separator, which broadly comprises a rotating assembly 9 carried on the shaft 1, and a casing surrounding said assembly 9. The casing comprises a circular volute 11 having a closed end 13 and a delivery pipe connection 15 (see also Fig. 3). From the other side of the volute 11 extends a frusto-conical piece 17, to which is attached (by bolts, welding, or the like) an oppositely-directed frusto-conical piece 19. The piece 19 comprises an extension of a cylindrical casing 21, to which is in turn attached a third frusto-conical member 23. From the member 23 extends an inlet pipe 25, which is preferably provided with a right-angle turn, as shown.

Webs or supporting standards 27 (see also Fig. 3) extend from the various casing elements to form supporting means for the separator. The bearings 3 and 5 are supported on brackets 29 and 31 mounted respectively upon the inlet pipe 25 and the end member 13. At the point of entrance of the shaft 1 into the inlet pipe 25 and the end member 13, grease seals 33 are desirably provided, such grease seals being of customary construction to provide a gas-tight joint. The entire casing assembly thus described is stationary, and is gas-tight (except for a dust outlet 35 to be described) from the inlet pipe 25 to the volute delivery pipe connection 15.

From the bottom of the cylindrical member 21 extends the dust outlet 35, which outlet commences as a hopper portion 37 and terminates as a pipe 39 which can be arranged to conduct the discharged dust to any suitable receptacle or location. Or, the lower portion of the casing member 21 may be formed directly as a dust receptacle, eliminating the hopper 37 and pipe 39.

In some instances, it may be advisable to surmount the hopper 37 with a scoop or baffle which tends to direct the dust accumulating at the periphery into the hopper, thus segregating such dust from the dirt-laden air more efficiently and completely.

The rotating assembly 9 comprises, in general, three sections which are bolted together in rigid assembly on the shaft 1. Numeral 41 indicates the first section, which comprises a casting of generally conical conformation, having an outward frusto-conical portion 43 and an inner disc portion 45. The disc portion 45 is centrally bored to accommodate the shaft 1, and is pinned thereto by a cross-pin 47, the pin 47 providing against longitudinal motion of the section 41 on the shaft 1, and at the same time providing for coextensive rotation of said shaft 1 and section 41. Radially positioned on the outer surface of the section 41 are vanes or fan blades 49 (see also section A of Fig. 2) which will hereinafter be referred to as the scalping blades. The blades 49 are desirably just wide enough to provide running clearance between their outer edges and the conical portion 23 of the stationary casing. In length, each of the blades 49 preferably extends from the shaft 1 to the end of portion 23, and each blade 49 outwardly terminates as a blade portion 51 which is substantially at right-angles to the shaft 1. As illustrated, twelve blades 49 are disposed about the section 41, but it will be apparent that this number may be altered at will to suit the circumstances of construction of the separator.

Numeral 53 indicates the second section of the rotating assembly 9. It comprises a substantially cylindrically shaped shell or casting 55, the cross section of which, while at all times circular, varies considerably in diameter from point to point along the shaft 1. The casting 55 includes a portion 57 which is inwardly concave, a portion 59 which is roughly conical, and a portion 61 which is substantially disc-like. The left-hand (Fig. 1) end of the casting 55 comprises a flange 63, which seats in a suitably positioned groove 65 provided in the central disc portion 45 of the casting 41. Extending radially outwardly from the casting 55 are vanes or blades 67 (see also Figures 2B and 2C) which extend from end to end of said casting 55. The portion of the blades 67 opposite the concave portion 57 have straight edges 69 parallel to the axis of the shaft 1, while the edges of the blades 67 opposite the portions 59 and 61 conform generally to the shape of said portions 59 and 61. These edges are positioned at running-clearance distance from the casing portion 17. The blades 67, together with the casting 55, terminate at the inner entrance to the volute 11. The blades 67, together with portions 59 and 61 of the casting 55 and the casing portion 17, will be seen to comprise a substantially completely shrouded air-impeller. A ring 71 at the inner end of the straight edges 69 of the blades 67 provides strengthening means for the assembly, and provides an annular running clearance for sealing to the last cone.

Welded or otherwise affixed in position on the straight edges 69 of the blades 67 are a series of closely spaced, nested cones 73. The cones 73 are stamped or otherwise formed from relatively light, albeit strong metal, and are identical with each other. Their angle of conicity (the angle which their sides make with the axis of rotation) is desirably somewhat greater than the angle of slip or repose of the particles to be separated. For silica dust separation, for example, the angle of conicity of the cones 73 is desirably made 45°, as shown. The cones 73 are spaced closely, a separation of the order of one-tenth of an inch being ordinarily advisable. The number of cones is adjusted to the desired capacity of the separator. It will be seen that the angle of conicity of the cones 73 determines many of the design factors of other portions of the separator, such as the casing design, the fan-blade design, and the like. The innermost cone 73 is spaced at running-clearance distance from the stationary conical portion 17 of the outer casing, such portion 17 thus providing that no gas can reach the volute 11 from the cylindrical portion 21 of the casing without first passing inwardly through the cone interspaces. The stationary portion 17 is thus positioned at running clearance distance from and between the coextensively rotating innermost cone 73 and the edges of fan blades 67.

The third section of the rotating assembly 9 comprises a disc 75, the outer edge 77 of which constitutes a flange received by a groove 79 in the casting 55. The disc 75 is centrally drilled to receive the shaft 1. Bolts 81 (four in number in the present embodiment) pass through suitable holes arranged around the disc 75 and are threaded at their lower ends into the disc portion 45 of casting 41. By drawing up the bolts 81, it will be seen that the entire assembly 9 is made rigid and rotates as a unit with the shaft 1.

The operation of the separator is as follows:

It is assumed that the prime mover is rotating the shaft 1 at a relatively high rotational speed, such as one thousand or more revolutions per minute. The fan-blades 67, particularly the outer extremities thereof, create a suction at the inlet pipe 25 which is considerably greater than any counter-pumping action of the cones 73. The suction draws in dust-laden air (assuming that this is the subject of the separation) through the pipe 25 into the conical interspace between the housing section 23 and the rotating member 41. Here it is forced into rotation by the blades or vanes 49, and the air stream thus reaches the outer periphery of the casing travelling in a swirl with a tangential velocity substantially equal to that of the rotating assembly itself. The tangential velocity of the air swirl is in fact somewhat greater than that, for example, of the edges of the cones 73, for the blades 49 extend radially beyond the cones 73 at the point that the air is delivered therefrom. During this tangential acceleration of the air current, the dust in the air has been subjected to a considerable centrifugal force, enough, at least, to cause the coarser particles to fly radially outwardly and precipitate upon the inner surface of the housing member 23. The force of the air current is sufficient, however, to carry these precipitated particles radially outwardly until they pass from the section 23 into the section 21, to be handled together with the remainder of the precipitated dust in a manner to be described. This precipitation of the larger particles in the conical interspace between the section 23 and the member 41 is referred to as the scalping of the incoming dirt-laden air, and while it is not the principal function of the blades 49 to effect such scalping, it is an advantageous incidental effect, for it tends to relieve the more important precipitating cones of part of their work.

The dirt-laden air thus enters the peripheral chamber at the outer edges of the cones 73 travelling in a circular path at a high speed. It will be seen that there is but one path for this air to travel, namely, inwardly through the spaces between the cones 73, under the suction influence of the blades 67. There is thus imparted to the air stream a direction component radially inwardly. Now, the friction between the air stream and the cone surfaces is but slight, so as the air stream travels radially inwardly, it maintains to a substantial extent the tangential velocity that it possessed at the peripheries of the cones 73. Since its radius of curvature is decreasing, therefore, its angular speed increases as it comes closer to the center. This increase of angular speed is a compensating factor for the decrease in radius in the centrifugal force formula, and the centrifugal force tending to precipitate the dust particles thus remains at a high level even up to the center of the cones 73. The tangential speed may actually increase as the air flows radially inwardly, on account of the work done on the air in drawing it inwardly, by the blades 67. Thus, at any rate there is a pronounced forward swirl of the air stream relative to the cones themselves as the air moves inwardly.

The foregoing applies to a free vortex with smooth cones in which the gases are free to increase their angular velocity as they approach the central portion of the cones. However, in the use of the word "vortex" we intend also to include a restricted swirl such as would be present were the cone surfaces to be provided with radial or substantially radial vanes and the gas flow is thus constrained to move with substantially only a radial direction component, the tangential direction component being eliminated by such vanes to a great extent.

The centrifugal force on the dust particles tends to cause them to move radially outwardly until they contact the inner faces of the cones 73, that is, they precipitate. Inasmuch as the radial distance through which the dust particles must travel to precipitate is, ordinarily relatively slight, ordinarily, for example, one-sixth of an inch, and the velocity (and hence the centrifugal force) are both extremely high, precipitation of even the finer particles readily takes place.

The dust is thus precipitated from the air on the inner surfaces of the cones 73. The air, which is substantially cleaned of all of its dust-content by the time it reaches the inner edge of the cones 73, is drawn through the blades 67 and peripherally distributed into the volute 11, whence it passes from the separator through the outlet 15.

The air distributes itself equally in passing through the spaces between the cones 73, so that an equal volume tends to pass through each cone. This is true because, if one cone-space became overcharged with air, such space would immediately exert a greater counter-pumping effect, and thereby immediately equalize itself with the other cones.

The path of the air-stream in the cones 73 will be seen to be substantially that of a vortex, or tornado.

The stream of progressively cleaner gas thus moves counter to the movement of the dust.

The precipitated particles on the surface of the cones 73 will now be considered. These particles are no longer suspended, and accordingly, no longer move in accordance with Stokes' law. The forces now acting on the particles comprise, first, a radially-outwardly-directed centrifugal force (set up by the rotation of the cones 73), and, second, a wind friction occasioned by the forward swirl movement of the air in the cone interspaces relative to the movement of the cones themselves. The centrifugal force resolves into two components, one directed out to the periphery of the cones along the surface thereof, and the other directed normally against the cone surface. Thus the particle tends to roll or slide outwardly toward the periphery of the cone on which it lies. But the wind friction does not permit the particle to roll directly radially outwardly, but rather moves it in somewhat of a spiral as shown by the dotted-line path indicated by numeral 83 on Fig. 2, section B. The movement tends to become more nearly radial as the particle approaches the periphery, as the forward swirl velocity of the air decreases, relative to the cone speed, towards the periphery. The wind-force tends to make the particle roll over and over as it moves, in contrast to a simple sliding. The normally directed component of the centrifugal force now comes into play, and with the other forces acting on the particle, tends to make it agglomerate or coalesce with the other particles in its path of movement. This action is similar to that of a snow-ball in rolling down a hillside. A particle that starts near the center of the cones, therefore, reaches the cone periphery as but a part of an immensely larger agglomerate of particles or "snow-ball". It has been observed microscopically that these agglomerates, in the case of colloidal silica dust, for example, are several hundred times the diameter of the individual dust particle.

The agglomerated particles, as they reach the periphery of the cones, are of sufficient size and have sufficient coalescence to be trajected from the edge of the cone across the incoming air stream to the casing wall 21 without disintegrating. Or, if the particles have not built up into an agglomerate sufficiently large and coherent not to distintegrate, they are picked up by the incoming air stream and carried back into the cone interspaces to be reprecipitated again and again until they do become agglomerates of sufficient size, etc., to hold their shape.

The centrifugal force throwing the dust agglomerates out from the edge of the cones 73 is so great that, were it not for influences to be described, these agglomerates would tend to pile up and form a level against the cylindrical portion 21 and conical portion 19 of the stationary casing. However, the extensions 51 of the fan blades 49 are positioned to agitate the dust agglomerates thus collecting and keep them moving, at least to the extent that they travel, either with the incoming air stream or under the influence of gravity, towards the bottom of the casing, finally to be discharged as a substantially solid stream through the outlet 35. It will be understood that the air currents are such, that together with the constantly precipitating particles or agglomerates, there is no great tendency for mixing of the incoming dirt-laden air and the precipitated particles, the effect, on the contrary, being one of segregation into relatively well-defined layers. In this manner the collected dust is constantly removed from the separator, and the separator may be characterized as continuously discharging, which, it will be recalled, was one of the principal objects of the invention.

By computation from the Stokes' law formula given in Equation (3) hereinbefore, and the laws of centrifugal force, it may be shown that, in a device constructed as thus described, the quantity of gas passed in cubic centimeters per second Q may be expressed by the formula:

$$Q = \frac{Kd^2p}{m} V_s^2 (r_2 - r_1) n K_x$$

where $d$ is the diameter of the particle, in centimeters, $p$ is the density of the particle, in grams per cubic centimeter, $m$ is the viscosity of the gas, in c. g. s. units, $V_s$ is the tangential velocity of the gas in centimeters per second, $r_2$ and $r_1$, are, respectively, the outer and inner radii of the cones, in centimeters, $n$ is the number of passages between the cones through which the dirt-laden gas travels, K is a constant, approximating the value $$\frac{4\pi}{9}$$

and $K_x$ is an experimental constant greater or less than one depending on minor factors, favorable and unfavorable. Possible favorable factors are (1) the turbulence causing agglomeration of the particles, (2) segregation as retarding the outer, more concentrated layer, and accelerating the inner, cleaner layer, and (3) the factor of increased forward swirl velocity resulting from the increment of energy imparted to the gas as it is pulled to the center. Possible unfavorable factors are (1) frictional retardation of forward swirl between the cones, and (2) slower settling velocity of non-spherical particles.

Figures 4, 5:
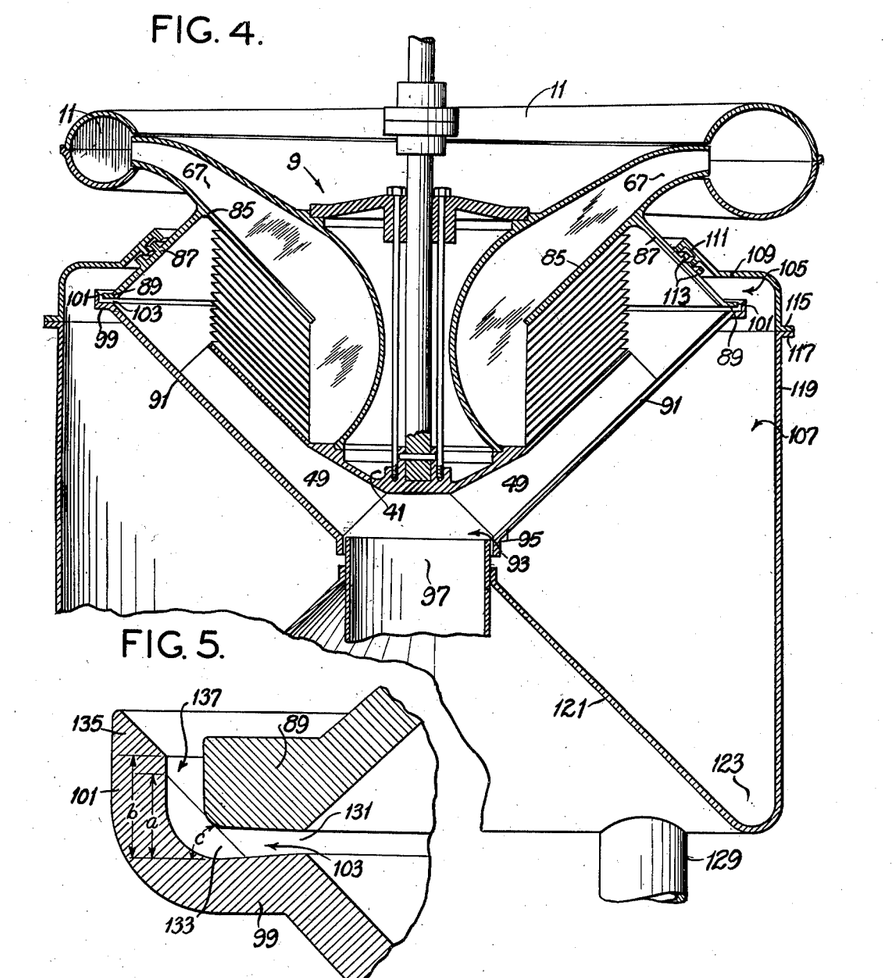
Fig. 4 is an axial section of a second embodiment of the invention.
Fig. 5 is an enlarged sectional view of a fragment of the embodiment shown in Fig. 4.

In Figures 4 and 5 is illustrated an alternative embodiment of the invention operating on generally the same principles, but differing in the means provided for continuous discharge of the accumulated dust. For convenience of description in this embodiment, supporting means, bearings, and the like have been generally eliminated, it being understood that such should be embodied in the device as constructed for actual operation.

Figure 2:
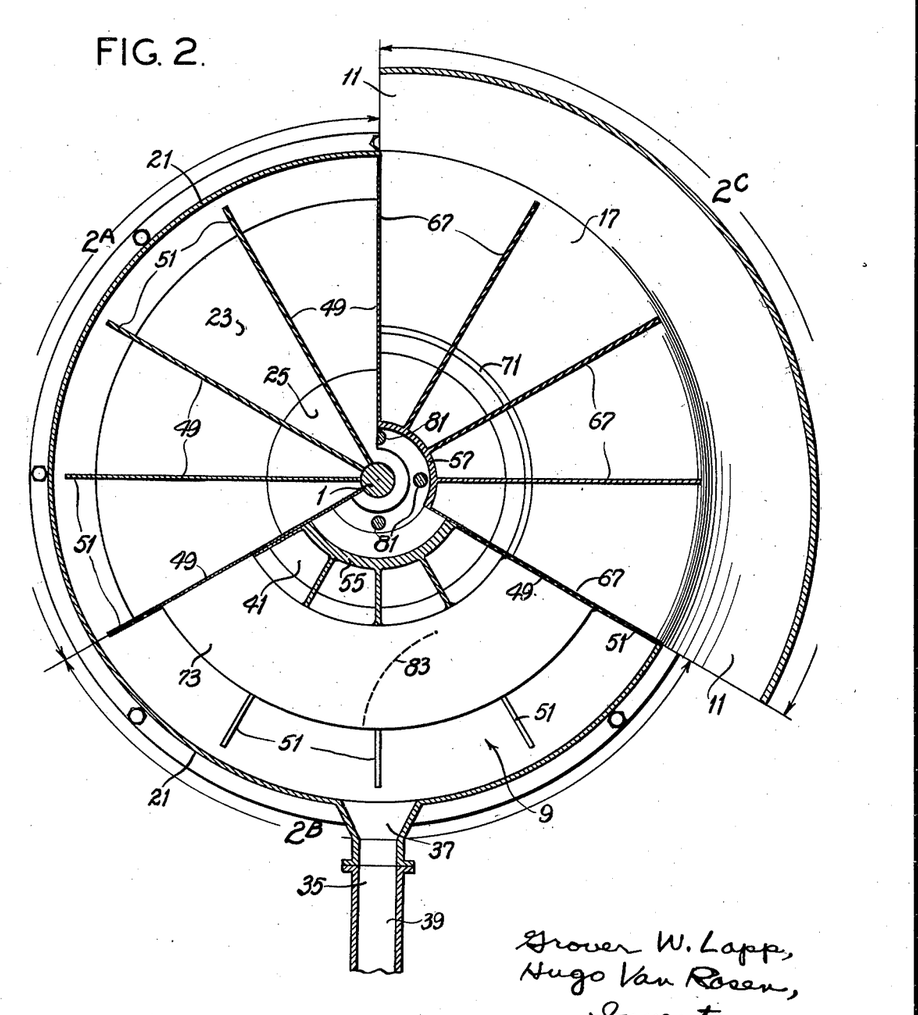
Fig. 2 is a composite view, representing cross sections taken along lines 2A, 2B, and 2C of Fig. 1.
Figure 3:
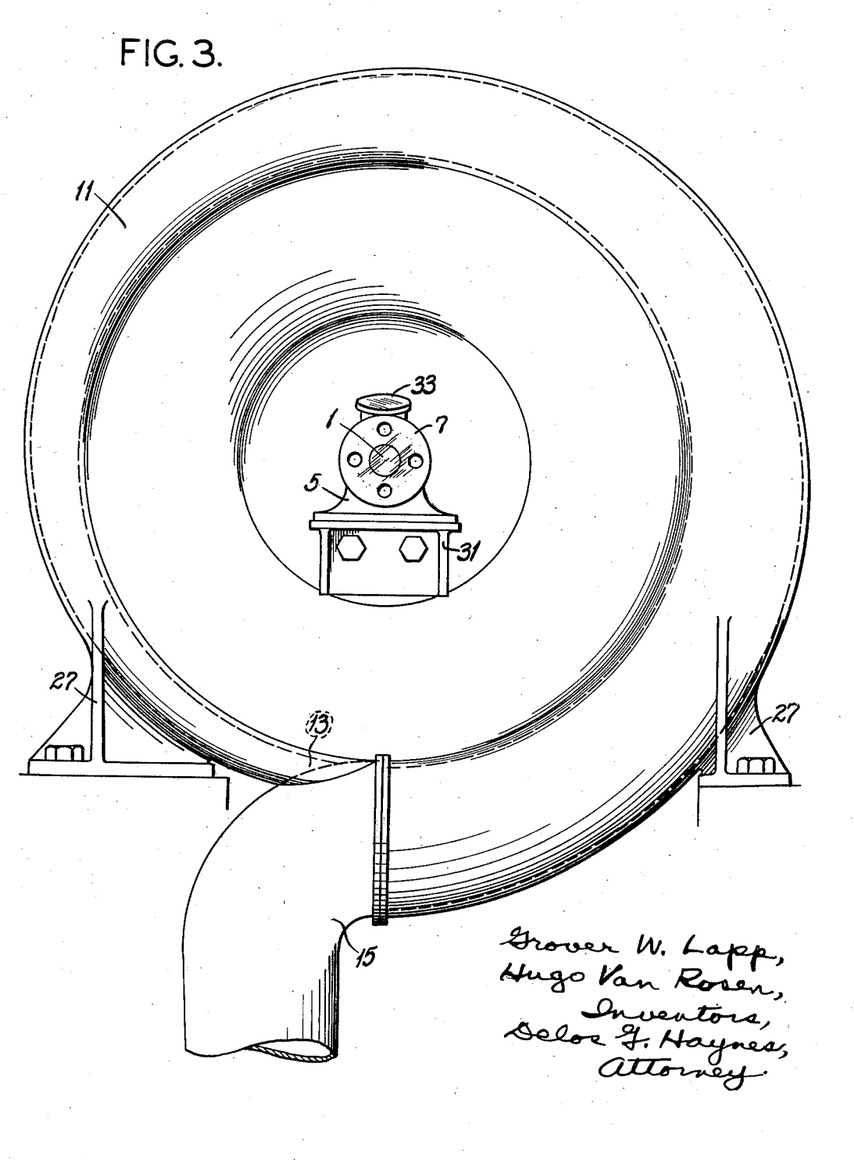
Fig. 3 is a right hand end elevation of the separator of Fig. 1.

Internally, this embodiment does not differ in any essential detail from the embodiment of Figures 1, 2 and 3. The principal changes are those in the encasing means. For example, in the present embodiment, the central member of the rotating assembly 9 includes as a part thereof a conical piece 85, which forms an inner shroud for the fan blades 67. The piece 85, which rotates with the assembly, replaces the analogous stationary portion 17 of the casing in the Fig. 1 embodiment. A conical casing member 87, corresponding generally in location to the analogous portion 19 of the Fig. 1 embodiment is welded or otherwise affixed to the portion 85 and rotates therewith, whereas the analogous portion 19 in Fig. 1 was stationary. The portion 87 outwardly terminates in a horizontal flange 89, which will be described in more detail hereinafter.

Supported on, and preferably formed integrally with the scalping fan blades 49 of the lower rotating assembly section 41 is a conical lower casing member 91. The member 91 is analogous to the portion 23 of the Fig. 1 embodiment, but rotates with the assembly 9 instead of being stationary. The portion 91 terminates downwardly in an opening 93, which is formed by a vertical flange 95, and which embraces a stationary inlet pipe 97. The spacing between the flange 95 and the stationary pipe 97 is desirably only enough to provide running clearance. The portion 91 extends upwardly and outwardly to a position of approximate intersection with the portion 87. Instead, however, of actually touching the portion 87, the portion 91 terminates in a horizontal flange 99 and a vertical flange 101 which together surround the horizontal flange 89 of the portion 87 without actually touching the same; that is, a passage 103 is left between the flange 89 on the one hand, and the flanges 99 and 101 on the other hand. The importance of this passage 103 will be described in more detail hereinafter.

The volute 11 is stationary in the present embodiment, as it was in the embodiment of Fig. 1, but it is now independent of the dust-catching casing, and surrounds only the edge of the fan blades 67, now completely shrouded, and which deliver their cleaned air into said volute.

A stationary dust-collecting container surrounds the rotating assembly, and comprises an upper section 105 and a lower section 107. The upper section 105 includes a horizontal top portion 109 and a portion 111 which fits against the rotating casing portion 87. Between the portion 111 and the portion 87 are provided a series of inter-fitting ridges and grooves indicated generally by the numeral 113, the purpose of these ridges and grooves being to provide a tortuous passage for any air which might attempt to leak past this juncture between the stationary casing and the moving casing. It is not necessary that this juncture be absolutely sealed, as leakage is not of great consequence at this point, but only that an unnecessary large volume of leakage be prevented.

The upper portion 105 of the stationary container joins the lower portion 107 by means of facing flanges 115 and 117 respectively. The lower portion 107 of the container comprises vertical side walls 119 and a sloping bottom portion 121, the portions 119 and 121 together forming an annular trough 123. The bottom portion 121 terminates by joining the stationary air inlet pipe 97 in a rigid joint. One or more dust-outlet pipes 129 lead from the bottom of the trough 123 and are arranged to conduct away whatever dust collects in said trough.

Fig. 5 illustrates in greatly enlarged form the manner in which the flanges 89, 99 and 101 fit together. Inwardly, the lower surface of flanges 89 and the upper surface of flange 99 converge so that the passage 103 is narrower at its inner end 131 than at its outer end 133. The vertical flange 101 terminates in a tapered portion 135. However, the flange 101 is so dimensioned that its depth $b$ is greater than the distance $a$ subtended by an angle C drawn tangent to the outer edge of the flange 89, as shown; the angle C being equal to the angle of slip or repose of the separated dust material (in the exemplary case of silica dust, the angle C is about forty-five degrees). The arrangement of flanges thus described constitutes a dust valve, the operation of which will be described hereinafter.

The operation of this embodiment of the invention is in general quite similar to that of the embodiment of Fig. 1, the dirt laden air being drawn in through the scalping blades 49 and raised to a high circular or swirl velocity by the time it reaches the outer edges of the cones 73. Precipitation of the dust particles takes place in the manner heretofore described on the surfaces of the cones 73, and dust agglomerates are expelled radially outwardly from the outer cone edges as heretofore described. However, in the present embodiment the casing members 87 and 91 against which the agglomerates are thrown are rotating together with the cones 73, so that the agglomerates, in lodging on the surface of portions 87 and 91, are still subjected to centrifugal forces which tend to move them radially outwardly. The annular passage 103 represents the maximum radial movement that can take place, and hence this is the region towards which the dust particles and agglomerates all move. Assuming that the device is in full operation and the precipitation is taking place at such a rate that a considerable volume of dust agglomerates is present at the passage 103, it will be seen that a tendency will be exhibited by the dust particles to fill up the passage 103 and build up a sloping level indicated by the line establishing the angle C in Fig. 5, in the vertical portion 137 of the passage. Since the distance $b$ is greater than the distance $a$, no dust particles will, for the instant, discharge over the edge 135. However, as more and more dust collects in the passage 103, a positive dust pressure is built up, and this is eventually sufficient to force the accumulated dust in the vertical passage 137 to overflow the edge 135 into the container 107. There is no chance for the dust to jam in the passage 103 because of the outwardly diverging character of said passage, from the narrow region 131 to the wide region 133.

In this manner the dust accumulates in the passage 103 until it builds up a positive pressure, when it discharges itself over the edge 135 and into the container 107. Thus, in operation there is a continuous discharge from the rotating assembly into the stationary container 107. As the dust builds up a level in container 107, it flows therefrom by way of the dust outlets 129. Thus, the device is a continuous discharge one and there is no necessity to stop operations from time to time to remove the accumulated dust.

While the embodiment of Fig. 4 is shown as constructed upon a vertical axis, it will be understood that this embodiment may be designed to operate on a horizontal axis, as is the case with Fig. 1 embodiment, merely by a suitably relocation of the dust outlets 129 relative to the container 107. The dust valve portion will operate irrespective of the angle at which the device is mounted, for the force tending to operate the dust valve are, almost entirely, centrifugal forces set up by the rotation of the separator.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A dust separator comprising a plurality of nested cones, said cones being spaced apart a relatively short distance, means rotating said cones on their axes at a relatively high rotational speed, means creating a current of dust-laden gas, and means directing said gas current inwardly about the periphery of said cones at a high tangential velocity, whereby said gas current flows through said cones toward the center thereof in the manner of a vortex, the vortex movement of the gas causing precipitation of the dust particles therefrom on to the surfaces of the cones, and the centrifugal action occasioned by the rotation of said cones causing the precipitated dust particles to move radially outwardly on the cones in counter-current to the incoming gas current, said gas-directing means comprising at least in part a casing means rotating along with the cones against which the precipitated dust particles are thrown from the edges of the said cones, and means continuously removing the said dust particles as they accumulate in said casing means.

2. A dust separator comprising a plurality of nested cones, said cones being spaced apart a relatively short distance, means rotating said cones on their axes at a relatively high rotational speed, means creating a current of dust-laden gas, and means directing said gas current inwardly about the periphery of said cones at a high tangential velocity, whereby said gas current flows through said cones toward the center thereof in the manner of a vortex, the vortex movement of the gas causing precipitation of the dust particles therefrom on to the surfaces of the cones, and the centrifugal action occasioned by the rotation of said cones causing the precipitated dust particles to move radially outwardly on the cones in counter-current to the incoming gas current, said gas-directing means comprising at least in part a casing means rotating along with the cones against which the precipitated dust particles are thrown from the edges of the said cones, and means continuously removing the said dust particles as they accumulate in said casing means, said last-named means comprising an annular dust valve forming part of said casing.

3. A dust separator comprising a plurality of nested cones, said cones being spaced apart a relatively short distance, means rotating said cones on their axes at a relatively high rotational speed, means creating a current of dust-laden gas, and means directing said gas current inwardly about the periphery of said cones at a high tangential velocity, whereby said gas current flows through said cones toward the center thereof in the manner of a vortex, the vortex movement of the gas causing precipitation of the dust particles therefrom onto the surfaces of the cones, and the centrifugal action occasioned by the rotation of said cones causing the precipitated dust particles to move radially outwardly on the cones in counter-current to the incoming gas current, said gas-directing means comprising at least in part a casing means rotating along with the cones against which the precipitated dust particles are thrown from the edges of the said cones, and means continuously removing the said dust particles as they accumulate in said casing means, said last-named means comprising an annular dust valve forming part of said casing, and a stationary container surrounding said casing and receiving the dust as it is discharged through said dust valve, said container being provided with an outlet for the dust accumulating therein.

4. A separator as set forth in claim 1, in which the continuous dust-removing means comprises a dust valve comprising means effecting a horizontal annular passage, said passage outwardly terminating in an annular vertical passage, the vertical passage having a depth greater than the distance subtended by an angle equivalent to the angle of slip or repose of the dust material.

5. A separator as set forth in claim 1, in which the continuous dust-removing means comprises a dust valve comprising means effecting a horizontal annular passage, said passage increasing in width as it passes radially outwardly, said passage outwardly terminating in an annular vertical passage, the vertical passage having a depth greater than the distance subtended by an angle equivalent to the angle of slip or repose of the dust material.

6. A dust separator comprising means for rotating dust-laden gas and directing the gas outwardly and thereby partially purifying the gas by separating therefrom the larger particles, a surface against which said particles are deposited, a plurality of nested cones, said cones being spaced apart a relatively short distance, means rotating said cones on their axes at a relatively high rotational speed, said gas current flowing inwardly between said cones at a high tangential velocity, whereby said gas current flows through said cones to the center thereof in the manner of a vortex, the vortex movement of the gas causing precipitation of the dust particles therefrom onto the surfaces of the cones and the centrifugal action occasioned by the rotation of said cones causing the precipitated dust particles to move radially outwardly on the cones in counter-current to the gas current and be thrown against said surface, and means for continuously removing said precipitated dust particles from the separator.

7. A dust separator comprising a stationary casing, a rotating assembly within said casing, means admitting dust-laden gas to said assembly, and means conducting cleaned gas from said assembly, said assembly including a plurality of nested cones, said cones being spaced apart a relatively short distance, means creating a current of dust-laden gas from said admitting means, said casing including means directing said gas current inwardly about the periphery of said cones at a high tangential velocity, whereby the gas current flows inwardly between said cones toward the center thereof in the manner of a vortex, the vortex movement of the gas causing precipitation of the dust particles therefrom on the surfaces of the cones, and the centrifugal action occasioned by the rotation of said cones causing the precipitated dust particles to move radially outwardly on the cone surfaces in counter-current to the incoming gas current, and to be thrown radially outwardly from the outer edges of said cones against said stationary casing, and means for continuously removing the dust thus accumulating against the stationary casing from the separator.

8. A dust separator comprising a stationary casing, a rotating assembly within said casing, means admitting dust-laden gas to said assembly, and means conducting cleaned gas from said assembly, said assembly including a plurality of nested cones, said cones being spaced apart a relatively short distance, means creating a current of dust-laden gas from said admitting means, said casing including means directing said gas current inwardly about the periphery of said cones at a high tangential velocity, whereby the gas current flows inwardly between said cones toward the center thereof in the manner of a vortex, the vortex movement of the gas causing precipitation of the dust particles therefrom on the surfaces of the cones, and the centrifugal action occasioned by the rotation of said cones causing the precipitated dust particles to move radially outwardly on the cone surfaces in counter-current to the incoming gas current, and to be thrown radially outwardly from the outer edges of said cones against said stationary casing, and means for continuously removing the dust thus accumulating against the stationary casing from the separator, comprising a series of fan blades disposed in proximity to said casing and rotatable along with said cones, and a dust outlet from said casing in proximity to said fan blades.

9. A dust separator comprising a stationary casing, a rotating assembly within said casing, means admitting dust-laden gas to said assembly, and means conducting cleaned gas from said assembly, said assembly including a plurality of nested cones, said cones being spaced apart a relatively short distance, means creating a current of dust-laden gas from said admitting means, said casing including means directing said gas current inwardly about the periphery of said cones at a high tangential velocity, whereby the gas current flows inwardly between said cones toward the center thereof in the manner of a vortex, the vortex movement of the gas causing precipitation of the dust particles therefrom on the surfaces of the cones, and the centrifugal action occasioned by the rotation of said cones causing the precipitated dust particles to move radially outwardly on the cone surfaces in counter-current to the incoming gas current, and to be thrown radially outwardly from the outer edges of said cones against said stationary casing, said means conducting cleaned gas from the rotating assembly comprising a stationary volute surrounding at least part of said assembly.

10. In a dust separator assembly, a driven shaft, means supporting said shaft, a shrouded impeller mounted on said shaft, said impeller having an axial inlet mouth, a separator comprising a series of spaced truncated cones mounted for rotation with said impeller, said cones flaring outwardly and towards the discharge of said impeller, the truncated ends thereof being open to form an axial space communicating with said mouth, the cones most remote from the impeller being closed, a casing surrounding said separator and mounted on the impeller, for rotation therewith, and a spiral scroll of gradually increasing cross sectional area, surrounding the periphery of said impeller and communicating therewith to receive air exhausted therefrom.

11. In a dust separator assembly, a driven shaft, means supporting said shaft, a shrouded impeller mounted on said shaft, said impeller having an axial inlet mouth, a separator comprising a series of spaced truncated cones mounted for rotation with said impeller, said cones flaring outwardly, the truncated ends thereof being open to form an axial space communicating with said mouth, the cone most remote from the impeller being closed, a casing surrounding said separator and mounted for rotation with the cones, and a spiral scroll of gradually increasing cross sectional area, surrounding the periphery of said impeller and communicating therewith to receive air exhausted therefrom.

12. In a dust separator assembly, a driven shaft, an impeller mounted on said shaft, a separator mounted on said shaft and delivering into said impeller, and a volute of gradually increasing cross sectional area, surrounding the periphery of said impeller and communicating therewith to receive air exhausted therefrom, and a housing surrounding the said separator and rotating therewith.

13. An assembly as set forth in claim 11, in which the impeller comprises radial fan blades, portions of which extend into said axial space and engage the truncated ends of the said cones.

14. In a dust separator assembly, a shrouded impeller comprising a substantially conical shroud and radial fan blades mounted thereon, said blades having portions extending axially from the apex of said shroud, the edges of which portions substantially forming elements of a cylinder, and a separator comprising a series of spaced truncated cones the truncated ends whereof are positioned surrounding said cylinder-forming edges.

15. In a dust separator assembly, a shrouded impeller comprising a substantially conical shroud and radial fan blades mounted thereon, said blades having portions extending axially from the apex of said shroud, the edges of which portions substantially forming elements of a cylinder, and a separator comprising a series of spaced truncated cones the truncated ends whereof are positioned surrounding said cylinder-forming edges, said truncated cones of the separator being convex in the same direction as the conical shroud.

16. In a dust separator assembly, a shrouded impeller comprising a substantially conical shroud and radial fan blades mounted thereon, said blades having portions extending axially from the apex of said shroud, the edges of which portions substantially forming elements of a cylinder, and a separator comprising a series of spaced truncated cones the truncated ends whereof are positioned surrounding said cylinder-forming edges, said truncated cones of the separator being convex in the same direction as the conical shroud, said separator being mounted for rotation with said impeller.

17. In a dust separator assembly, a shrouded impeller comprising a substantially conical shroud and radial fan blades mounted thereon, said blades having portions extending axially from the apex of said shroud, the edges of which portions substantially forming elements of a cylinder, and a separator comprising a series of spaced truncated cones the truncated ends whereof are positioned surrounding said cylinder-forming edges, said truncated cones of the separator being convex in the same direction as the conical shroud, said separator being mounted for rotation with said impeller, and a housing surrounding said separator and delivering dust-laden gas to the outer edges of said separator cones, to be sucked inwardly through said cones by said impeller and discharged outwardly from the periphery of said impeller.

GROVER W. LAPP.
HUGO VAN ROSEN.